(12) United States Patent
Soualle et al.

(10) Patent No.: US 9,979,434 B2
(45) Date of Patent: May 22, 2018

(54) BLANKING USING SIGNAL-BASED THRESHOLDING SCHEMES

(71) Applicant: Airbus DS GmbH, Taufkirchen (DE)

(72) Inventors: Francis Soualle, Munich (DE); Mathieu Cattenoz, Malakoff (FR)

(73) Assignee: Airbus DS GmbH, Taufkirchen (DE)

( * ) Notice: Subject to any disclaimer, the term of this patent is extended or adjusted under 35 U.S.C. 154(b) by 0 days. days.

(21) Appl. No.: 15/377,558

(22) Filed: Dec. 13, 2016

(65) Prior Publication Data

US 2017/0170867 A1  Jun. 15, 2017

(30) Foreign Application Priority Data

Dec. 15, 2015 (EP) .................................. 15200172

(51) Int. Cl.
  *H04B 1/7097* (2011.01)
  *H04B 1/7075* (2011.01)
  *H04B 1/707* (2011.01)

(52) U.S. Cl.
  CPC ....... *H04B 1/7097* (2013.01); *H04B 1/70755* (2013.01); *H04B 2001/70706* (2013.01)

(58) Field of Classification Search
  CPC .............. H04B 1/7097; H04B 1/70755; H04B 2001/70706
  See application file for complete search history.

(56) References Cited

U.S. PATENT DOCUMENTS

| | | | |
|---|---|---|---|
| 6,243,409 B1* | 6/2001 | Fenton | G01S 19/22 375/130 |
| 7,508,887 B1* | 3/2009 | Chavez | H04L 5/1423 370/310 |
| 2003/0043925 A1* | 3/2003 | Stopler | H04L 25/067 375/254 |
| 2006/0215739 A1* | 9/2006 | Williamson | H04B 1/7085 375/149 |

(Continued)

FOREIGN PATENT DOCUMENTS

| | | |
|---|---|---|
| EP | 2814197 | 12/2014 |
| EP | 2911307 | 8/2015 |

OTHER PUBLICATIONS

European Search Report, dated Jun. 22, 2016, priority document.

*Primary Examiner* — Syed Haider
(74) *Attorney, Agent, or Firm* — Greer, Burns & Crain Ltd.

(57) ABSTRACT

An apparatus comprising a blanker configured to provide a plurality of blanked signals, each blanked signal corresponding to a respective correlator channel signal of a plurality of correlator channel signals. The correlator channel signal is obtainable based on the respective blanked signal and a respective signal replica of a plurality of signal replicas, the signal replicas being shifted with respect to each other. The blanker is configured to obtain each blanked signal based on applying a respective thresholding scheme to a respective signal component of a plurality of signal components derived from a received spread-spectrum signal. The respec- (Continued)

tive thresholding scheme is based on the respective signal component and the signal replica based on which the correlator channel signal corresponding to the respective blanked signal is obtainable. A receiver comprising such an apparatus is provided as is a method comprising providing a plurality of blanked signals.

13 Claims, 5 Drawing Sheets

(56) References Cited

U.S. PATENT DOCUMENTS

| | | | | |
|---|---|---|---|---|
| 2007/0008215 | A1* | 1/2007 | Smith | G01S 19/21 342/357.29 |
| 2008/0291982 | A1* | 11/2008 | Kirby | G01S 19/21 375/148 |
| 2014/0368383 | A1 | 12/2014 | Wendel et al. | |
| 2015/0236751 | A1 | 8/2015 | Floch et al. | |

* cited by examiner

BLANKING USING SIGNAL-BASED THRESHOLDING SCHEMES

CROSS-REFERENCES TO RELATED APPLICATIONS

This application claims the benefit of the European patent application No. 15 200 172.3 filed on Dec. 15, 2015, the entire disclosures of which are incorporated herein by way of reference.

BACKGROUND OF THE INVENTION

The present disclosure generally relates to providing blanked signals and the processing thereof. In particular, the present disclosure, inter alia, relates to an apparatus comprising a blanker configured to provide a plurality of blanked signals, each blanked signal corresponding to a respective correlator channel signal of a plurality of correlator channel signals, the correlator channel signal being obtainable based on the respective blanked signal and a respective signal replica of a plurality of signal replicas, the signal replicas being shifted with respect to each other. Further, the present disclosure relates to a receiver comprising such an apparatus. Moreover, the disclosure relates to a method comprising providing a plurality of blanked signals.

Nowadays, signals are transmitted for a wide range of applications including communication and navigation applications. High performance processing at the receiver side as well as reception quality assessment are crucial to meeting user quality expectations and are therefore intensively investigated. For instance, US 2015/0236751 A1 and EP 2 911 307 A1 disclose techniques to acquire and track a spread-spectrum navigation signal at a receiver. US 2014/0368383 A1 and EP 2 814 197 A1 disclose techniques for determining an amount of noise in a received signal.

Blanking may be applied to modify signal portions, e.g., samples, that are assumed to be afflicted with an excessive amount of interference/noise as they exceed a threshold, for instance by setting them to a fixed value, e.g., 0. It may contribute to reduce the undesirable effects of interference/noise but usually part of the desired signal is lost, meaning sacrificed with the blanking operation. Nevertheless, blanking can help recovering the receiver signal processing performance compared to a scenario in which blanking is not applied.

Improved blanking techniques and apparatuses implementing them are desirable.

SUMMARY OF THE INVENTION

According to a first aspect, an apparatus is disclosed. The apparatus comprises a blanker configured to provide a plurality of blanked signals, each blanked signal corresponding to a respective correlator channel signal of a plurality of correlator channel signals, the correlator channel signal being obtainable based on the respective blanked signal and a respective signal replica of a plurality of signal replicas, the signal replicas being shifted with respect to each other. Therein, the blanker is configured to obtain each blanked signal based on applying a respective thresholding scheme to a respective signal component of a plurality of signal components derived from a received spread-spectrum signal. The respective thresholding scheme is based on the respective signal component and the signal replica based on which the correlator channel signal corresponding to the respective blanked signal is obtainable.

According to a second aspect, a receiver comprising an apparatus according to the first aspect is disclosed.

According to a third aspect, a method is disclosed. The method comprises providing a plurality of blanked signals, each blanked signal corresponding to a respective correlator channel signal of a plurality of correlator channel signals, the correlator channel signal being obtainable based on the respective blanked signal and a respective signal replica of a plurality of signal replicas, the signal replicas being shifted with respect to each other. Therein, each blanked signal is obtained based on applying a respective thresholding scheme to a respective signal component of a plurality of signal components derived from a received spread-spectrum signal. The respective thresholding scheme is based on the respective signal component and the signal replica based on which the correlator channel signal corresponding to the respective blanked signal is obtainable.

For the sake of conciseness, in the following description focus is put on providing further details on various implementations of the first aspect of the present disclosure. However, the information given with regard to the first aspect applies analogously to the second aspect and the third aspect.

In the apparatus according to the first aspect, the blanker is configured to obtain each blanked signal based on applying a respective thresholding scheme to a respective signal component of a plurality of signal components derived from a received spread-spectrum signal. The respective thresholding scheme is based on the respective signal component and the signal replica based on which the correlator channel signal corresponding to the respective blanked signal is obtainable.

Hence, each thresholding scheme is determined based on the specific signal component to which that thresholding scheme is to be applied. Thus, if at least a first correlator channel signal obtained based on a first signal component and a second correlator channel signal obtained based on a different second signal component are to be processed, e.g., in a tracking loop, for both signal components, a respective thresholding scheme that is based on and therefore adapted to the respective signal component is available for the blanking process. This will reflect in the provided blanked signals considered in obtaining the correlator channel signals. Therefore, correlator channel signal quality may improve compared to a case where unspecific thresholding disregarding the underlying signal component is employed.

Likewise, each thresholding scheme is determined based on the signal replica based on which the correlator channel signal corresponding to the respective blanked signal obtained from applying the thresholding scheme is obtainable. Thus, if at least a first correlator channel signal obtained based on a first signal replica and a second correlator channel signal obtained based on a different second signal replica are to be processed, a respective thresholding scheme that is based on and therefore adapted to the respective signal replica is available for the blanking process. This will reflect in the provided blanked signals corresponding to and considered in obtaining the correlator channel signals. Therefore, correlator channel signal quality may also improve compared to a case where unspecific thresholding disregarding the respective signal replica is used. This may be of particular relevance in case of comparatively large shifts between the signal replicas. Thus, comparatively high performance may be attained with a wide range of receiver configurations, including those that rely on signal replicas with comparatively large shifts.

Overall, having distinct thresholding schemes for each individual combination of a signal component that is to be blanked and a signal replica from which the correlator channel signal based on and corresponding to that blanked signal is obtainable may thus improve correlator channel signal quality. Since a variety of processing tasks of many types of receivers is based on the use of correlator channel signals, receiver processing performance, for instance expressed in terms of a signal-to-noise power density ratio (C/NO), may improve. This may also hold for other figures of merit of the receiver processing performances, like the jitter of the code or carrier phase tracking errors.

The received spread-spectrum signal may for instance be a navigation signal, e.g., a signal provided by a global navigation satellite system (GNSS) such as the Global Positioning System (GPS), GLONASS or the Galileo system. The received spread-spectrum signal may also be for instance a terrestrial navigation signal, e.g., a signal transmitted by a terrestrial equipment to support and augment performances of GNSS, such like a Pseudo-lite. Alternatively, the received signal may be a communication signal, e.g., for bidirectional communication between two entities, including voice and data communication. The communication signal may, for instance, circulate in a cellular communication network, e.g., a cellular mobile telephone network such as a 2G network, e.g., a network according to the Global System for Mobile Communications (GSM) standard, a 3G network, e.g., a network according to the Universal Mobile Telecommunications System (UMTS) standard, or any other generation standard including 4G network standards. As an example, the communication signal may have been transmitted by a base station or a user terminal within the network. Alternatively, the received signal may be a radar signal and thus contain signal waveforms for processing in the context of radar applications. Irrespective of its origin and purpose, the received spread-spectrum signal may for instance be a direct-sequence spread-spectrum (DSSS) signal or a code division multiple access (CDMA) signal.

When it is referred to a plurality of signals (e.g., a plurality of correlator channel signals or a plurality of blanked signals), signal components or signal replicas, a set of signals, signal components or signal replicas comprising at least two signals, signal components or signal replicas is meant.

The plurality of signal components derived from the received spread-spectrum signal may, for instance, be derived from the received spread-spectrum signal in the sense that the received spread-spectrum signal is pre-processed, e.g., converted to an intermediate frequency (IF), amplified, converted between the analog domain and the digital domain, etc. The plurality of signal components may then be derived from the pre-processed signal. Deriving the plurality of signal components may comprise decomposing the received spread-spectrum signal—or a pre-processed signal derived therefrom—into the plurality of signal components. As an example, a signal component of the plurality of signal components may be an in-phase signal component (I-component); and another signal component of the plurality of signal components may be a quadrature-phase signal component (Q-component). The I-component and the Q-component may be obtained by multiplying the received and possibly pre-processed, e.g., down-converted, spread-spectrum signal with two sinusoids which are offset in-phase by one quarter cycle ($\pi/2$).

The blanker may be configured to modify signal portions, e.g., samples, of the signal component. Specifically, portions of a signal component that are assumed to be afflicted with an excessive amount of interference/noise according to the respective thresholding scheme, e.g., portions exceeding limits set by the thresholding scheme, may be modified. To this end, the blanker may, for instance, be configured to set them to a fixed value, e.g., 0. Blanking may contribute to reducing undesirable effects of interference/noise and help recovering receiver signal processing performance compared to a scenario in which blanking is not applied. The blanker may for instance comprise/be implemented by a processor, e.g., a digital signal processor (DSP).

The signal replicas of the plurality of signal replicas may, for instance, be pseudo-random noise (PRN) code sequences identical to a PRN code modulated into a carrier of the received spread-spectrum signal. For obtaining signal replicas shifted with respect to each other, a shift register may for instance be employed. The shift register may be fed with the PRN code sequence generated by a code generator and shift them according to corresponding offsets. As an example, the plurality of signal replicas may comprise an early replica, a prompt replica and a late replica. The offset of the early replica and the late replica may be symmetric to the prompt replica, wherein the early replica is a copy of the prompt replica advanced by a chip fraction and the late replica is a copy of the prompt replica delayed by that chip fraction. In addition to an early replica, a prompt replica and a late replica, further signal replicas may be included in the plurality of signal replicas, e.g., a very early replica and a very late replica, which are advanced/delayed by a larger offset than the early replica and the late replica. Generally, any number of signal replicas may be considered, e.g., an arbitrary number of signal replicas in addition to a prompt replica. The arbitrary number of signal replicas provided in addition to the prompt replica may or may not be an even number. In case of an even number, the additional signal replicas may form pairs, wherein all replica pairs are symmetrical with respect to the prompt replica. As another example, at least some of the signal replicas may have an individual offset to the prompt replica. Accordingly, also in case of an even number of additional signal replicas, none of these additional signal replicas or at least not all of them may form such pairs.

A correspondence of a correlator channel signal and a blanked signal may be considered to exist when the correlator channel signal is obtainable (inter alia) based on the blanked signal.

Each correlator channel signal of the plurality of correlator channel signals may, for instance, be obtainable by multiplying the respective blanked signal that corresponds to that correlator channel signal by the respective signal replica of the plurality of respective signal replicas. After multiplication, each of the thus obtained multiplied signals may be integrated over time, e.g., at an integrate and dump stage, so as to increase the ratio between the power of any potential correlation peak and the variance of corresponding correlation peak to reduce the effects of the inherent noise, thereby obtaining the plurality of correlator channel signals. The above actions may be performed in a correlator. In an implementation, the apparatus according to the first aspect of the present disclosure comprises a correlator configured to provide the plurality of correlator channel signals.

According to an implementation, the respective thresholding scheme applied to a signal component of the plurality of signal components varies with the signal sequence of that signal component. Thus, in determining which signal portions, e.g., samples, of the signal components to modify due an assumed excessive amount of interference/noise, the signal sequence of that signal component is taken into account. This may yield a thresholding scheme adapted to the signal sequence and consequently a more accurate selection of signal portions to be modified that are really affected with an excessive amount of interference/noise. For instance, a respective thresholding scheme may vary with the temporal variation of the amplitude (e.g., sampled amplitude) of the respective signal component.

According to an implementation, the thresholding scheme is based on a constant value and a variable parameter varying with the signal sequence of the signal component. By having a thresholding scheme based on a constant value and a variable parameter, both a constant characteristic and a variable characteristic considered in blanking may be reflected in the thresholding scheme. This may yield improved accuracy in selecting signal portions really affected with an excessive amount of interference/noise. For instance, the constant value may be a value independent of the temporal variation of the signal amplitude of the respective signal component, i.e., a time-invariant value. The constant value may be a configurable constant value in the sense of it being set based on at least one parameter derived from a least one property of a signal component, signal replica, and/or signal rather than being fixed to a predetermined value irrespective of a signal component, signal replica, and/or signal.

Applying the thresholding scheme may, for instance, involve removing, e.g., subtracting, the variable parameter from the signal sequence of the signal component and then applying at least one threshold that is based on the constant value to the result of the subtraction, i.e., to the difference of the signal sequence of the signal component and the variable parameter. In this case, applying the thresholding scheme further comprises that after blanking, e.g., modifying signal portions, of the signal sequence resulting from the subtraction based on the at least one threshold, the variable parameter is reintroduced, e.g., added, to the blanked signal sequence (blanked difference of the signal sequence of the component signal and the variable parameter), thus obtaining the blanked signal. Alternatively, applying the thresholding scheme may comprise applying at least one threshold to the signal sequence of the component signal, i.e., without removal of the variable parameter from that signal sequence, wherein the at least one threshold is based on both the constant value and the variable parameter varying with the signal sequence of the signal component, so that the at least one threshold varies with the signal sequence of the signal component. In this case, after blanking, e.g., modifying signal portions, of the signal sequence based on the at least one threshold, no reintroduction of the variable parameter is required.

According to an implementation, the constant value is based on a parameter indicative of a characteristic of an influence present in the received spread-spectrum signal. The influence present in the received spread-spectrum signal may, for instance, be a disturbance present in the received spread-spectrum signal. Examples of influences, specifically disturbances, that may be present comprise noise, e.g., thermal noise, and interferences. Consequently, the influence present in the received spread-spectrum is taken into account by the thresholding scheme and thus in the blanking process. For instance, as a parameter indicative of a characteristic of an influence present in the received spread-spectrum signal, e.g., a standard deviation may be considered, such as a standard deviation of a thermal noise distribution. The constant value may be equal to the parameter indicative of a characteristic of an influence present in the received spread-spectrum signal multiplied by a scaling factor, e.g., equal to the standard deviation of the thermal noise multiplied by a scaling factor.

According to an implementation, the variable parameter is based on an amplitude and sign of the signal sequence of the signal component. This may correspond to considering the amplitude and sign of the signal component after decomposition of the received spread-spectrum signal, e.g., for I-components and Q-components after multiplication of the received spread-spectrum signal with the sin or cos function, and the sign of the chip of the signal sequence. Therein, a phase estimate of the signal component is considered. Specifically, it may be considered in the sense that the phase estimate forms part of the argument of the sin or cos function, respectively.

According to an implementation of the apparatus according to the first aspect of the present disclosure, the apparatus comprises an estimator, the estimator being configured to estimate at least one parameter indicative of a characteristic of an influence present in the received spread-spectrum signal. Thus, within the apparatus, an estimated parameter may be provided for determining the constant value. The estimator may also be configured to estimate a characteristic indicative of a power of the received spread-spectrum signal. Alternatively, another estimator may be provided to this end.

According to an implementation, the blanker is configured to determine the variable parameter based on the amplitude and sign of the signal sequence of the signal component scaled by a scaling factor based on the characteristic indicative of a power of the received spread-spectrum signal. As an example, the square root of an estimate of the power of the received spread-spectrum signal may serve as a scaling factor. Thus, the thresholding scheme may be adapted to the effective power of the received spread-spectrum signal. Accordingly, for selecting signal portions to be modified, what is considered an excessive amount of interference/noise may be based on the power of the received spread-spectrum signal. Other influences than the amplitude and sign of the signal sequence of the signal component and a scaling factor based on the characteristic indicative of a power of the received spread-spectrum signal may be considered in calculating the variable parameter. As an example, a constant factor or summand may be taken into account.

According to an implementation, the respective thresholding scheme the blanker is configured to apply in order to obtain a respective blanked signal is synchronized with the signal replica based on which the correlator channel signal corresponding to the respective blanked signal is obtainable. Having such synchronized thresholding schemes, e.g., synchronized with the chips/chip stream and thus chip transitions of the respective signal replica, comparatively high quality blanked signals may be obtained even in the presence of large shifts between the signal replicas. Thresholding scheme synchronization to a respective signal replica may, for instance, be achieved by first determining the variable parameter varying with the signal sequence of the signal component and without considering the shift of the respective signal replica and thereafter shifting the variable parameter accordingly. Alternatively, thresholding scheme synchronization may be performed by considering the shift of the respective signal replica in determining the variable parameter by using the amplitude and sign of the signal sequence of the signal component shifted according to the shift of the respective signal replica. In this case, one might also say that the blanker is configured to determine the variable parameter based on the amplitude and sign of the signal sequence of the signal component under consideration of the respective signal replica, e.g., configured to determine the variable parameter based on the amplitude and sign of the signal sequence of the signal component shifted according to the shift of the signal replica.

According to an implementation, each thresholding scheme comprises at least two thresholds. Put differently, each thresholding scheme comprises a number T of thresholds, where in T≥2. Therein each threshold may vary with the signal sequence of the signal component of the plurality of signal components to which the respective thresholding scheme is applied. Alternatively or in addition, each threshold may be synchronized with the signal replica based on which the correlator channel signal corresponding to the respective blanked signal obtained by applying the respective thresholding scheme is obtainable.

For instance, each thresholding scheme may comprise at least one lower threshold and at least one upper threshold. For instance, in the case of T=2, i.e., one upper threshold and one lower threshold being provided, the blanker may modify signal portions that are assumed to be afflicted with excessive interference/noise as they lie outside a corridor formed by the upper and the lower thresholds. As an example, according to this approach, the signal portions subject to an excessive interference, whether with positive or negative amplitudes (e.g., sampled amplitude), may be modified depending. According to another example, in case of T=4, two upper thresholds and two lower thresholds may be provided. Thus the blanker may, for instance, modify both positive amplitude (e.g., sampled amplitude) signal portions that lie in an upper corridor limited by the two upper thresholds and negative amplitude (e.g., sampled amplitude) signal portions that lie in a lower corridor limited by the lower thresholds. In an example, the two lower thresholds may be denoted BTH1 and BTH2, while the two upper thresholds may be denoted BTH3 and BTH4, wherein BTH1<BTH2<BTH3<BTH4. Thus, signal portions having an amplitude (e.g., sampled amplitude) between BTH1 and BTH2 and signal portions having an amplitude between BTH3 and BTH4 are modified.

Generally speaking, each thresholding scheme comprising at least two thresholds may enable selecting signal portions for modification, whether with positive or negative amplitudes (e.g., sampled amplitudes), based on at least one corridor defined by at least one threshold.

Processing of correlator channel signals is a key function of many types of receivers. For this task, inter alia, tracking loops may be employed. For instance, the apparatus according to the first aspect of the disclosure may be configured to implement at least one such tracking loop. A tracking loop may at least partially be implemented by a receiver processor. Examples of tracking loops include a delay lock loop (DLL), a phase lock loop (PLL), such as a Costas loop, and a frequency lock loop (FLL). A DLL may, for instance, serve for estimating a code delay, while a PLL or an FLL may serve for carrier phase estimation. A thus estimated code delay and a thus estimated carrier phase may, inter alia, be exploited for synchronization with the received spread-spectrum signal and for demodulation purposes. Generally, tracking loops include discriminators. In case of a DLL, for instance, a discriminator called early-late correlator (ELC) or a double delta correlator (DDC) discriminator may be provided. Different types or implementations of tracking loops may consider correlator channel signals obtained based on different signal components and/or different signal replicas.

According to an implementation, the apparatus according to the first aspect is configured to implement a number of tracking loops, the number being equal to or greater than 1, the tracking loops being configured to collectively process at least a first correlator channel signal corresponding to a blanked signal obtained based on a first signal component and a second correlator channel signal corresponding to a blanked signal obtained based on a second signal component, the first signal component being different from the second signal component. With correlator channel signals corresponding to—and thus obtained based on—blanked signals based on different signal components being processed in the tracking loops, having signal component specific thresholding schemes may be of particular use.

According to an implementation, the apparatus according to the first aspect is configured to implement a number of tracking loops, the number being equal to or greater than 1, the tracking loops being configured to collectively process at least a first correlator channel signal of the plurality of correlator channel signals and a second correlator channel signal of the plurality of correlator channel signals, the first correlator channel signal obtained based on a first signal replica and a second correlator channel signal obtained based on a second signal replica, the first signal replica being different from the second signal replica. With correlator channel signals based on different signal replicas being processed, having signal replica specific thresholding schemes may be of particular use.

According to an implementation, the blanker is arranged in a digital receiver channel. This may be beneficial since for determining the thresholding schemes, the signal components and the signal replicas, which may be generated in the receiver channel, are needed. A number of digital receiver channels may be provided in a receiver, e.g., corresponding to a number of different spread-spectrum signals the receiver is capable of processing. Each of the receiver channels may be provided with a blanker. The blanker or the blankers arranged in the one or more digital receiver channels, may replace a blanker arranged further upstream in the receiver and thus outside of any receiver channel.

Other features of the present disclosure will become apparent from the following detailed description considered in conjunction with the accompanying drawings. However, the drawings are designed solely for purposes of illustration and not as a definition of the limits of the disclosure, for which reference should be made to the appended claims. The drawings are not drawn to scale. They are merely intended to conceptually illustrate the structures and procedures described herein.

DETAILED DESCRIPTION OF THE PREFERRED EMBODIMENTS

Figure 1:
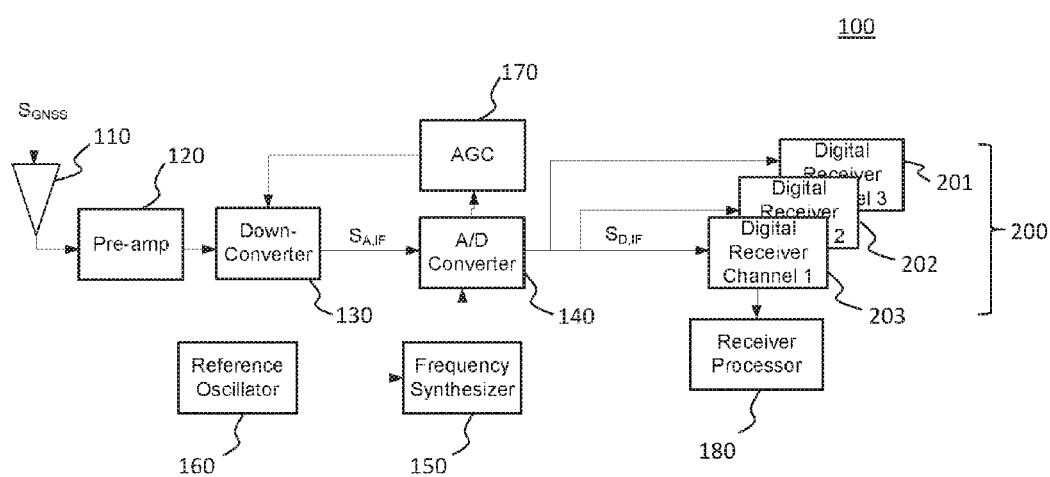
FIG. 1 is a schematic illustration of an embodiment of a GNSS receiver according to the second aspect of the present disclosure, which is also an apparatus according to the first aspect of the present disclosure.

FIG. 1 is a schematic illustration of an embodiment of a GNSS receiver 100 according to the second aspect of the present disclosure, which is also an apparatus according to the first aspect of the present disclosure.

Receiver 100 comprises an antenna 110, a pre-amplifier 120, a down-converter 130, an analog-to-digital converter (ADC) 140, a frequency synthesizer 150, a reference oscillator 160, an automatic gain control (AGC) 170, a receiver processor 180 and a number N of digital receiver channels exemplified by digital receiver channels 201 to 203, jointly designated 200. Therein, the number N represents the number of line-of-sight GNSS signals that the receiver 100 is capable of processing in order to make a position fix (usually the higher the number N is, the better is the position determination accuracy).

Antenna 110 is configured to receive radio frequency (RF) GNSS spread-spectrum signals SGNSS from a number of line-of-sight GNSS satellites. In the present example, signals SGNSS may for instance be CDMA signals. For example, in case of the GPS C/A signal, a signal SGNSS may have a frequency of 1575.42 MHz Navigation information is modulated onto signal SGNSS. In the present example, the navigation data comprises at least the time of transmission of the signals, the satellite orbit and timing correction parameters.

From antenna 110, signal SGNSS is fed to pre-amplifier 120. Pre-amplifier 120 is configured to increase the received signal to a level (voltage) compatible to the following sections of the receiver front-end. To this end, pre-amplifier 120 may comprise a single or several amplifiers mounted in cascade, wherein a first amplifier called low noise amplifier (LNA) may be characterized by a comparatively small noise figure (NF). In receiver 100, the output signal of pre-amplifier 120 is provided to down-converter 130. Down-converter 130 is configured to down-convert the signal fed to it to an intermediate frequency (IF). In the illustrated receiver configuration, the down-conversion is performed in analog, i.e., before the signal passed ADC 140, but it could also be performed in the digital domain, if the sampling frequency of ADC 140 is large enough according to the Nyquist condition. To perform the down-conversion, down-converter 130 is configured to multiply the signal fed to it and having a frequency fRF (e.g., 1575.42 MHz) with a cosine at frequency fRF-fIF. Down-converter 130 is configured to feed the down-converted signal SA,IF at the intermediate frequency to ADC 140. ADC 140 is configured to transfer signal SA,IF to the digital domain by sampling and quantization, thus providing digital signal SD,IF. In order to adapt the power of the received signal in near real time, automatic gain control (AGC) 170 is provided. AGC 170 is configured to monitor the power level of the samples of digital signal SD,IF and to provide, to down-converter 130, information needed for multiplying the received, pre-amplified signal at frequency fRF with a variable gain. Frequency synthesizer 150 is configured to, in combination with reference oscillator 160, provide time and frequency reference for the front end components of receiver 100 (typically, in a receiver such as receiver 100, the part before the ADC is referred to as the analog front-end and the part following the ADC as the digital front-end). ADC 140 is configured to inject the samples of signal SD,IF into the N digital receiver channels 200, the configuration of which will now be explained with reference to FIG. 2.

Figure 2:
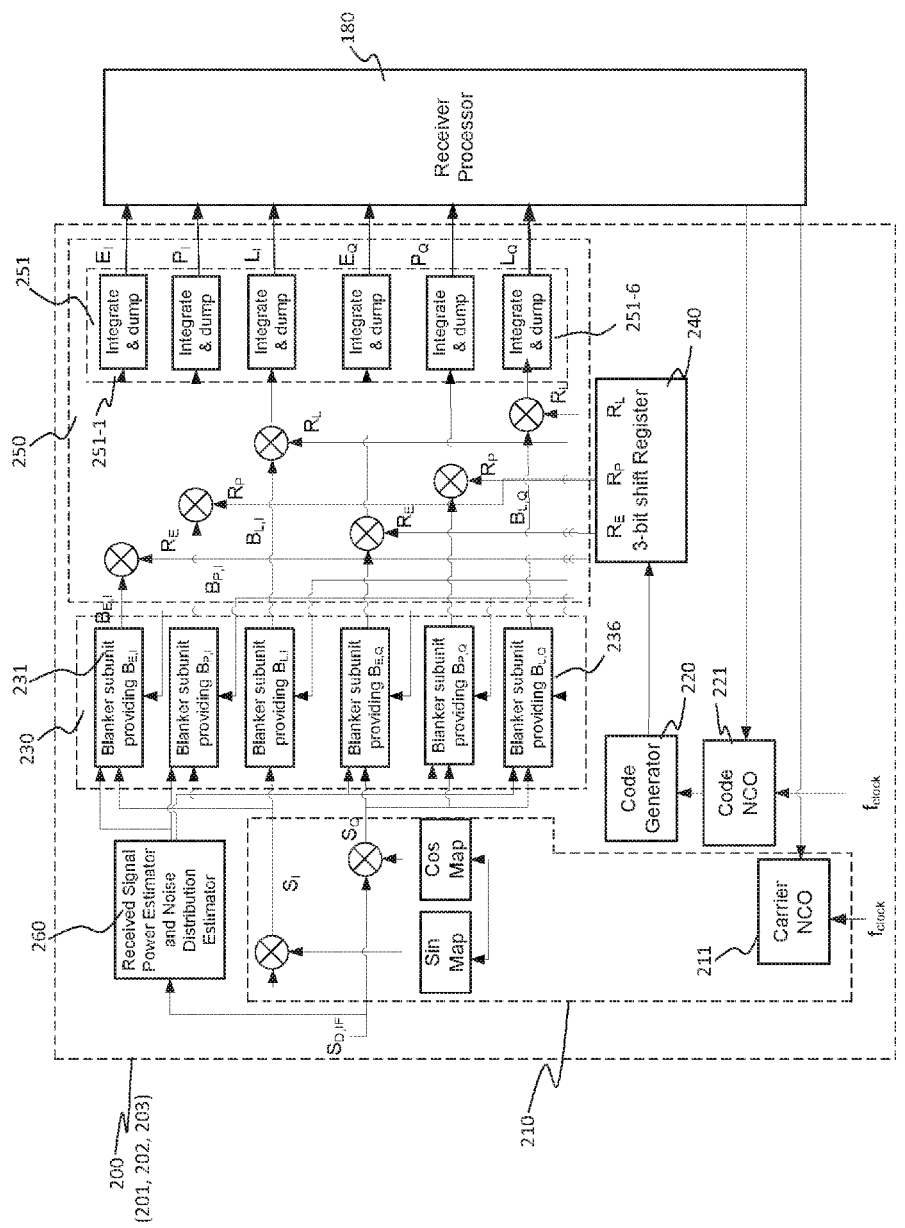
FIG. 2 is a schematic illustration of a digital receiver channel of the receiver of FIG. 1, the receiver channel, inter alia, comprising a blanker, together with a receiver processor of the receiver of FIG. 1.

FIG. 2 shows a schematic illustration of a digital receiver channel among the N digital receiver channels 200, the receiver channel, inter alia, comprising a blanker 230, together with receiver processor 180.

The N digital receiver channels 200 of receiver 100 have corresponding configurations. Thus, the receiver channel of FIG. 2 may be any of the N digital receiver channels, e.g., channel 201, channel 202 or channel 203. Therefore, generic reference numeral 200 will be used in the following. Generally, each digital receiver channel 200 is configured to process a digital intermediate frequency signal SD,IF by first wiping-off the remaining carrier frequency and then providing the different correlator channel signals necessary for signal acquisition but also for code and carrier estimations as well as navigation data demodulation. Correlations are the key operation for GNSS receivers to synchronize with the incoming signal, generate GNSS observables, and retrieve the navigation message that will be used to provide a navigation solution later on.

Digital receiver channel 200 comprises a decomposer 210, a code generator 220, a numerically controlled oscillator (NCO) 221, a blanker 230, a shift register 240, a correlator 250 and an estimator 260. Comprising blanker 230, receiver channel 200 is an apparatus according to the first aspect of the present disclosure.

As explained above with respect to FIG. 1, digital signal SD,IF having the intermediate frequency is fed to digital receiver channel 200. The digital signal is obtained from pre-processing GNSS spread-spectrum signal SGNSS received by antenna 110 of receiver 100. Decomposer 210 of digital receiver channel 200 is configured to decompose digital signal SD,IF into an in-phase-signal component (I-component) and a quadrature-phase-signal component (Q-component). To obtain the I-component, decomposer 210 is configured to multiply digital signal SD,IF by a sine function whose argument is the remaining carrier plus an estimate of the carrier phase. To obtain the Q-component, decomposer 210 is configured to multiply digital signal SD,IF by a cosine function whose argument is the remaining carrier plus the estimate of the carrier phase. For providing the carrier phase estimate, a carrier NCO 211 is provided. Carrier NCO 211 is fed with a control signal originating from a phase lock loop (PLL) implemented in receiver processor 180.

Digital signal SD,IF is based on the received GNSS spread-spectrum signal SGNSS as it is obtained by pre-processing signal SGNSS. Therefore, both the I-component (named component SI in FIG. 2) and the Q-component (named component SQ in FIG. 2) of signal SD,IF may likewise be considered signal components derived from the received spread-spectrum signal SGNSS, signal components SI and SQ thus jointly forming a plurality of signal components derived from received GNSS spread-spectrum signal SGNSS.

Blanker 230 arranged in digital receiver channel 200 may replace a blanker arranged further upstream in the receiver 100 and thus outside of any receiver channel 200. Blanker 230 is configured to provide a plurality of blanked signals formed by blanked signals BE,I, BP,I, BL,I, BE,Q, BP,Q and BL,Q (for the sake of clarity, the signal lines symbolizing the provision of blanked signals BE,Q and BP,Q to the respective downstream components are not labelled accordingly). Therein, blanker 230 is configured to obtain each of blanked signals BE,I, BP,I, BL,I, BE,Q, BP,Q or BL,Q based on applying a respective thresholding scheme to a respective signal component (component SI or component SQ). To this end one blanker subunit is provided for generating each of blanked signals BE,I, BP,I, BL,I, BE,Q, BP,Q or BL,Q (subunits 231 to 236, with labels 232 to 235 omitted in FIG. 2 for the sake of clarity). Before configuration and operation of blanker 230 are explained in detail, however, the description of the overall configuration of receiver channel 200 is completed.

In GNSS spread-spectrum signal SGNSS, a pseudo-random noise (PRN) code is modulated into the carrier. For reconstruction the information content modulated into signal SGNSS, i.e., demodulating it, inter alia, a code generator 220 is provided in digital receiver channel 200. Code generator 220 is configured to generate a PRN code sequence identical to the PRN code modulated into the carrier of a signal the respective digital receiver channel 200 is designed to process. GLONASS uses the same PRN code for all its signals so that for a GLONASS spread-spectrum signal receiver, the code generators 220 in each digital receiver channel may all generate the same PRN code sequences. GPS and Galileo both use different PRN code sequences for each signal. Code generator 220 is configured to be steered by a code NCO 221 which is, in turn, configured to receive a control signal from a delay lock loop (DLL) implemented by receiver processor 180 (in the same manner that carrier NCO 211 is configured to receive a control signal from the PLL implemented by receiver processor 180).

Shift register 240, in the present example a 3-bit shift register, is configured to provide a plurality of signal replicas, in the present example three signal replicas. To this end, shift register 240 is configured to be fed with the PRN code sequence generated by code generator 220 and configured to shift the code sequence according to three corresponding offsets provided in shift register 240 (early, prompt and late offsets). Thus, an early replica RE, a prompt replica RP, and a late replica RL, the replicas shifted with respect to each other, are obtainable. Therein, the prompt replica represents the best estimate of the received GNSS spread-spectrum signal SGNSS. It is noted that according to another example embodiment, another number of signal replicas, in particular a larger number of signal replicas, may be provided, e.g., at least five signal replicas.

Correlator 250 of digital receiver channel 200 is configured to provide a plurality of correlator channel signals, the correlator channel signals thereof denoted by EI, PI, LI, EQ, PQ and LQ in FIG. 2. To this end, correlator 250 is configured to obtain each of the correlator channel signals EI, PI, LI, EQ, PQ and LQ based on a respective corresponding blanked signal of the plurality of blanked signals formed by BE,I, BP,I, BL,I, BE,Q, BP,Q or BL,Q (signal line labels BE,Q and BP,Q not provided in FIG. 2 for the sake of clarity) and a respective signal replica of the plurality of signal replicas formed by early replica RE, prompt replica RP, and late replica RL by multiplication thereof. Namely, as a step towards obtaining early in-phase correlator channel signal EI, correlator 250 multiplies blanked signal BE,I (obtained by blanker 230, specifically its respective subunit 231, by applying a respective thresholding scheme to signal component SI) by early replica RE. Analogously, obtaining prompt in-phase correlator channel signal PI comprises multiplying blanked signal BP,I (obtained by blanker 230 by applying a respective thresholding scheme to signal component SI) by prompt replica RP; and obtaining late in-phase correlator channel signal LI comprises multiplying blanked signal BL,I (obtained by blanker 230 by applying a respective thresholding scheme to signal component SI) by late replica RL. Analogously, obtaining early quadrature-phase correlator channel signal EQ comprises multiplying blanked signal BE,Q (obtained by blanker 230 by applying a respective thresholding scheme to signal component SQ) by early replica RE; obtaining prompt quadrature-phase correlator channel signal PQ comprises multiplying blanked signal BP,Q (obtained by blanker 230 by applying a respective thresholding scheme to signal component SQ) by prompt replica RP; and obtaining late quadrature-phase correlator channel signal LQ comprises multiplying blanked signal BL,Q (obtained by blanker subunit 236 by applying a respective thresholding scheme to signal component SQ) by late replica RL. Correlator channel signal EI and EQ may be referred to as early correlator channel signals E; PI and PQ may be referred to as prompt correlator channel signals P; and LI and LQ may be referred to as late correlator channel signals L.

Thus, each correlator channel signal of the plurality of correlator channel signals formed by signals EI, PI, LI, EQ, PQ and LQ is based on a unique combination of a blanked signal of the plurality of blanked signals formed by signals BE,I, BP,I, BL,I, BE,Q, BP,Q and BL,Q and a signal replica of the plurality of signal replica formed by early replica RE, prompt replica RP and late replica RL.

After multiplication, the thus obtained multiplied signals are fed to an integrate and dump (I&D) stage 251 of correlator 250, the stage 251 having a plurality of subunits denoted 251-1 to 251-6 (some of the reference numerals omitted in FIG. 2 for clarity). Therein, one subunit is provided for each of the multiplied signals fed to stage 251. Each of subunits 251-1 to 251-6 is configured to integrate the respective multiplied signal fed to it over time so as to increase the ratio between the power of any potential correlation peak and the variance of the correlation peak to reduce effects of the inherent noise. Each of subunits 251-1 to 251-6 is configured to provide at its output a respective correlator channel signal EI, PI, LI, EQ, PQ or LQ. These six correlator channel signals are fed to receiver processor 180.

As a basis for obtaining a position fix, receiver processor 180 is configured to estimate the code delay with a DLL and to estimate the carrier phase, e.g., with a PLL or an FLL, for synchronization with received GNSS spread-spectrum signal SGNSS. Further, receiver processor 180 is configured to demodulate the navigation information modulated onto GNSS spread-spectrum signal SGNSS. Based on those pieces of information, a pseudo-range between a respective satellite from which GNSS spread-spectrum signal SGNSS originates and the receiver 100 can be derived. Using pseudo-ranges derived from received GNSS spread-spectrum signals SGNSS originating from at least four different GNSS satellites, each pseudo-range obtained based on the output of a different one of digital receiver channels 200, a triangulation can be performed to obtain an estimate of the position and the time on the GNSS system scale of receiver 100. The pseudo-range estimation and the triangulation may for instance be performed in a navigation processor that may for instance form part of receiver 100 (not shown in FIG. 1). The estimated position and timing information may for instance be made available on a user interface (not shown in FIG. 1).

Operation and configuration of blanker 230, in particular the thresholding schemes and their application to a respective signal component SI or SQ, are now described in more detail.

Estimator 260 is configured to be fed with digital signal SD,IF and configured to estimate the standard deviation noise as a parameter indicative of the thermal noise distribution in the received GNSS spread-spectrum signal SGNSS. Estimator 260 is further configured to estimate a characteristic indicative of a power P of received signal SGNSS from signal SD,IF. Estimator 260 is configured to provide the estimated information to blanker 230, specifically to each of its subunits. Operation of the subunits 231 to 236 will now be explained. Likewise, estimator 260 may be configured to be fed with signal components SI and SQ (corresponding signal lines are not shown in FIG. 2) and may be configured to estimate the standard deviation σnoise and a characteristic indicative of a power P of received signal SGNSS from SI and SQ. As a further possibility, estimator 260 may be configured to be fed with correlator channel signals output by I&D stage 251 (corresponding signal lines are not shown in FIG. 2) e.g., with a correlator channel signal for each of the plurality of signal components, the correlator channel signals being associated with the same signal replica. For instance, estimator 260 may be configured to be fed with correlator channel signals PI and PQ by subunits 251-2 and 251-5. Estimator 260 may be configured to estimate a characteristic indicative of a power P of received signal SGNSS from correlator channel signals PI and PQ.

The thresholding scheme a respective subunit of blanker 230 is configured to apply to a respective signal component SI or SQ comprises a lower blanking threshold BTH− and an upper blanking threshold BTH+, jointly denoted BTH in the following. In case the signal component fed to a respective blanker subunit is I-component SI, the lower blanking threshold may be denoted by BTH−I and the upper blanking threshold may be denoted by BTH+I (jointly BTHI). Likewise, in case of the signal component being Q-component SQ, the lower blanking threshold may be denoted by BTH−Q and the upper blanking threshold may be denoted by BTH+Q (jointly BTHQ). In other scenarios, the thresholding scheme a respective subunit of blanker 230 is configured to apply may comprise more than two thresholds.

Each of blanking thresholds BTHI− and BTHI+ (resp. BTHQ− and BTHQ+) applicable to the I-component (resp. Q-component) is based on a constant value B0, i.e., a value independent of the temporal variation of the signal amplitude of the respective signal component, and a variable parameter cI(t) (resp. cQ(t)) varying with the signal sequence of the respective I-component (resp. Q-component) signal amplitude, i.e., varying with the temporal variation of the amplitude of the respective I-component (resp. Q-component) signal. The blanking thresholds for the I-component are calculated as follows:

$$BTHI+=cI(t)+B0, \text{ and}$$

$$BTHI-=cI(t)-B0.$$

Therein, constant value B0 is set to the standard deviation σnoise scaled by a scaling factor β, in the present example 0.5, i.e., B0=0.5σnoise, the constant value thus being based on a thermal noise distribution. cI(t) is the current chip amplitude of the respective I-component of the signal. cI(t) equals the ±1 value of the chip scaled by a scaling factor α, which in the present example is set to sqrt(Pest) and multiplied with the cosine of the carrier phase error estimate from the PLL or FLL. For the Q-component, cQ(t) is the current chip amplitude of the respective Q-component of the signal. cQ(t) equals the ±1 value of the chip scaled by a scaling factor α, which in the present example is set to sqrt(Pest) and multiplied with the sine of the carrier phase error estimate from the PLL or FLL. Therein, Pest represents the above-explained characteristic indicative of a power P of received signal SGNSS. In the ideal case Pest is equal to P. Thus, each subunit of blanker 230 is configured to determine the respective variable parameter c(t) for the respective thresholding scheme it is configured to apply based on an amplitude of the signal sequence of the respective I or Q signal component fed to it and scaling factor α that is in turn based on the power estimate Pest of the received GNSS spread-spectrum signal SGNSS and the respective cosine or sine of the carrier phase error estimate. Other influences than the amplitude and sign of the signal sequence of the respective signal component I or Q and a scaling factor α based on Pest may be considered in calculating the variable parameter c(t). As an example, a constant factor or summand may be taken into account.

To provide an example of an effect that may arise from having signal component specific thresholding schemes, the receiver process called Costas loop, which is one type of PLL applicable for determining a carrier phase in presence of modulated symbols, may be considered. To obtain a carrier phase estimate (pest, the discriminator of the Costas loop considers the prompt in-phase correlator channel signal PI and the prompt quadrature-phase correlator channel signal PQ according to the equation (φest=arctan(PI/PQ). Because the in-phase and quadrature components appear respectively at numerator or denominator, the impact of the noise contribution in the in-phase and quadrature component onto the phase estimate will not be the same. As a consequence, it may be beneficial to have distinct thresholding schemes to be applied to the signal components SI and SQ in order to obtain blanked signals BP,I and BP,Q based on which correlator channel signals PI and PQ are obtainable.

Having signal component specific thresholding schemes may also be beneficial for other correlator channel signal types than prompt correlator signals PI and PQ. For instance, in a code DLL, according to the coherent processing approach only the in-phase correlator channel signals EI and LI are used. According to the non-coherent processing approach, both the in-phase signals EI and LI and the quadrature-phase correlator channel signals EQ and LQ of the early and late correlator channel signal types are used. This further illustrates the use of having distinct thresholding schemes to be applied to the signal components SI and SQ. Generally speaking, advantages may for instance arise—irrespective of a correlator channel signal type—if a number of tracking loops (wherein the number is ≥1) the receiver 100 is configured to implement is configured to collectively, e.g., all of these tracking loops considered together, process at least a first correlator channel signal corresponding to a blanked signal obtained based on a first signal component and a second correlator channel signal corresponding to a blanked signal obtained based on a second signal component (the first signal component being different from the second).

In addition to being configured to be fed with the estimated information from estimator 260 and the respective signal component SI or SQ, each blanker subunit is configured to also be provided with a respective signal replica of the plurality of signal replicas formed by early replica RE, prompt replica RP and late replica RL. The respective thresholding scheme a blanking subunit is configured to apply is not only based on the respective signal component but also based on the respective signal replica. Thus, each blanked signal of the plurality of blanked signals formed by signals BE,I, BP,I, BL,I, BE,Q, BP,Q and BL,Q is unique.

This is due to the thresholding scheme blanker 230 is configured to apply to a respective signal component SI or SQ to obtain a respective blanked signal being specific to the combination of: 1) the respective signal replica RE, RP or RL from which the correlator channel signal corresponding to the respective blanked signals is obtainable; and 2) the respective signal component SI or SQ to which the thresholding scheme is to be applied through the carrier phase tracking error used to generate the cosine and sin multiplicative terms.

In the presently discussed example, for each subunit of blanker 230, the thresholding scheme applied by it is synchronized with the respective signal replica based on which the correlator channel signal corresponding to the respective blanked signal to be generated by the subunit is obtainable. Synchronization of a thresholding scheme to a respective signal replica is further elucidated in the following. Thresholding scheme synchronization to a respective signal replica may for instance be achieved by first determining the variable parameter c(t) varying with the signal sequence of the signal component I or Q as above, i.e., without considering the shift of the respective signal replica RE, RP or RL, and thereafter shifting the variable parameter accordingly. Alternatively, thresholding scheme synchronization may be performed by considering the shift of the respective signal replica RE, RP or RL in determining the variable parameter c(t), which could then be denoted cE,I(t), cP,I(t), cL,I(t), cE,Q(t), cP,Q(t) and cL,Q(t), by using the amplitude and sign of the signal sequence of the respective signal component I or Q shifted according to the shift of the respective signal replica RE, RP or RL. In this case one might also say that blanker 230 is configured to determine the variable parameter c(t) based on the amplitude and sign of the signal sequence of the respective signal component I or Q under consideration of the respective signal replica RE, RP or RL, e.g., configured to determine the variable parameter c(t) based on the amplitude and sign of the signal sequence of the respective signal component I or Q shifted according to the shift of the respective signal replica RE, RP or RL. Apart from thus considering the respective signal replica RE, RP or RL, determination of c(t) may be performed in accordance with explanations provided above for the case of subsequent synchronization to the respective signal replica RE, RP or RL.

Figure 3:
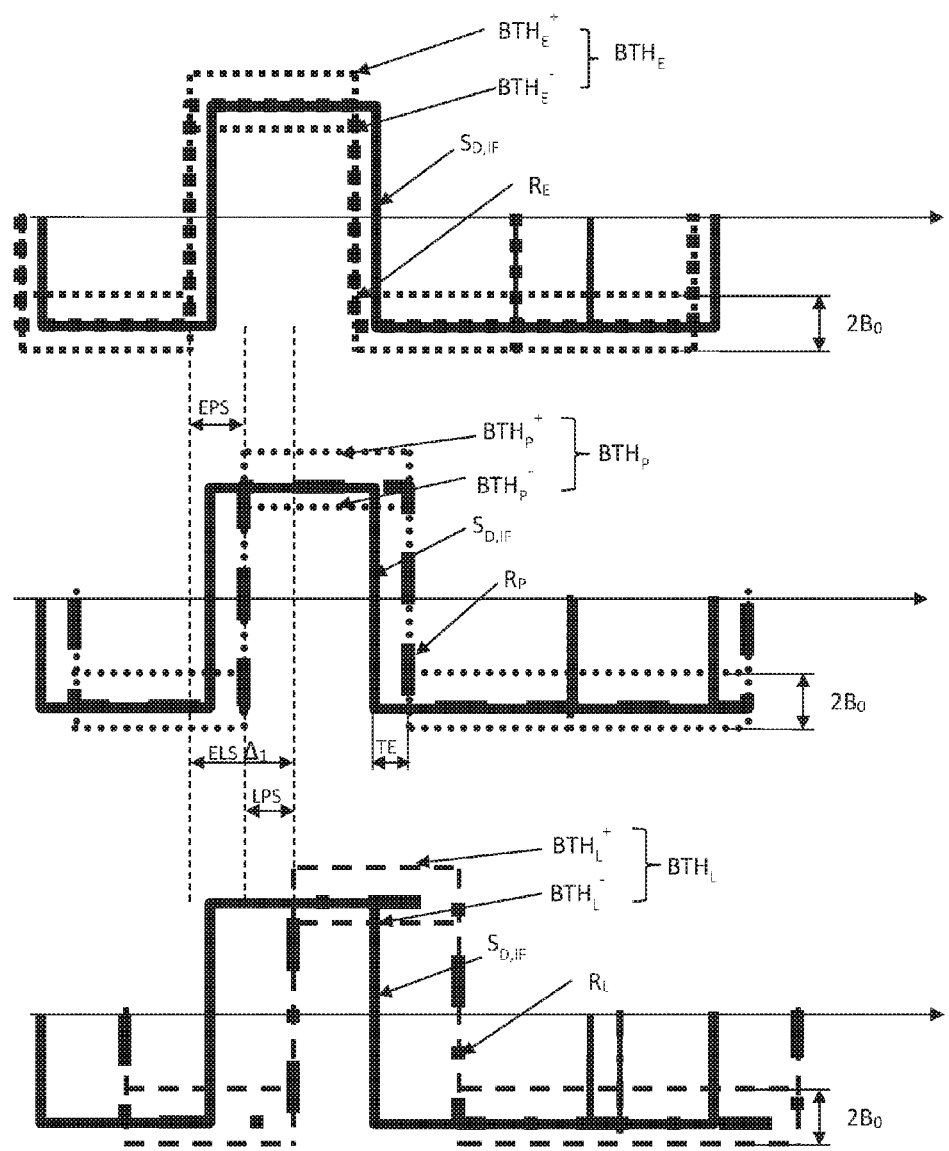
FIG. 3 is a schematic illustration of three thresholding schemes, each thresholding scheme synchronized to a different signal replica.

FIG. 3 is a schematic illustration of three thresholding schemes BTHE, BTHP and BTHL, each thresholding scheme synchronized to a different signal replica. The thresholding schemes BTHE, BTHP and BTHL may either be based on and applied to an I-component (an alternative notation for the thresholding schemes then being BTHE,I, BTHP,I and BTHL,I) or a Q-component of the signal (thresholding schemes BTHE,Q, BTHP,Q and BTHL,Q).

Specifically, the top diagram of FIG. 3 shows synchronization to early replica RE, the central diagram shows synchronization to prompt replica RP and the bottom diagram shows synchronization to late replica RL. To this end, in each diagram the chips of signal SD,IF obtained by processing received GNSS spread-spectrum signal SGNSS in the analog and digital front-end of receiver 100 (solid line) are shown together with upper and lower blanking thresholds of the respective thresholding scheme. The chips of the signal replicas themselves are not shown, but rather represented only indirectly by the thresholds synchronized thereto. For the sake of simplicity, FIG. 3 refers to a situation where the thermal noise has a smaller power than signal SD,IF.

In the present example, early replica RE is a copy of prompt replica RP advanced by a chip fraction $\delta 1 = -\Delta \frac{1}{2}$. Late replica RL is a copy of prompt replica RP delayed by a chip fraction $\delta 2 = +\Delta \frac{1}{2}$. Early replica RE and late replica RL are thus symmetrical to prompt replica RP. $\Delta 1$ is called early-late spacing (ELS) and is in the present example expressed in chip. For instance, $\delta 1$ and $\delta 2$ may be determined in shift register 240. It is noted that it is possible to consider further signal replicas, for instance, the so-called very early replica RVE as well as the very late replica RVL. They can be obtained in a similar manner as early replica RE and late replica RL. For instance, in the present example, very early replica RVE may be a copy of prompt replica RP advanced by a chip fraction $\delta 3 = -\Delta 2/2$; and very late replica RL RVL may be a copy of prompt replica RP delayed by a chip fraction $\delta 4 = +\Delta 2/2$, wherein $\Delta 2 > \Delta 1$. Generally speaking, a number U of signal replicas (and accordingly further correlator channel signals) may be considered in addition to prompt replica RP. The number U of signal replicas provided in addition to the prompt replica may or may not be an even number. In case of an even number, the U additional signal replicas may, for example, form U/2 pairs of signal replicas, all symmetrical with respect to prompt replica RP and obtained by shifting prompt replica RP according to a chip fraction $\{\delta u\} u \in [1:U]$. As another example, at least some of the U signal replicas may have an individual offset to the prompt replica RP. Accordingly, also in case of an even number of additional signal replicas, none of these additional signal replicas or at least not all of them may form such pairs.

In addition to the early-late spacing (ELS), the early-prompt spacing (EPS), the late-prompt spacing (LPS) and the tracking error (TE) between prompt replica RP and signal SD,IF are also illustrated in FIG. 3.

Referring to the top diagram of FIG. 3, while the chips of the signal replicas themselves are not shown, but rather represented only indirectly by the thresholds synchronized thereto, it can be understood that the thresholding scheme BTHE is synchronized with early replica RE, i.e., synchronized with the chip stream/chip transitions of early replica RE. Specifically, it comprises upper blanking threshold BTHE+ and lower blanking threshold BTHE−, which are both synchronized with early replica RE. Thus, when the amplitude of RE changes, the value of the upper threshold and the value of the lower threshold also change at that point of time. Shown in the central diagram is that thresholding scheme BTHP comprising upper blanking threshold BTHP+ and lower blanking threshold BTHP− is synchronized with prompt replica RP. Finally, the bottom diagram shows that thresholding scheme BTHL comprising upper blanking threshold BTHL+ and lower blanking threshold BTHL− is synchronized with late replica RL.

Accordingly, the thresholding schemes applied to obtain blanked signal BE,I and BE,Q based on which corresponding correlator channel signals EI and EQ are obtainable, are synchronized with early replica RE that is also considered for obtaining correlator channel signals EI and EQ. Likewise, the thresholding schemes applied to obtain blanked signal BP,I and BP,Q based on which corresponding correlator channel signals PI and PQ are obtainable, are synchronized with prompt replica RP that is also considered for obtaining correlator channel signals PI and PQ. The thresholding schemes applied to obtain blanked signal BL,I and BL,Q based on which corresponding correlator channel signals LI and LQ are obtainable, are synchronized with late replica RL that is also considered for obtaining correlator channel signals LI and LQ.

In other words, the upper thresholds BTH+ and the lower thresholds BTH− to which the samples fed to a respective subunit of blanker 230 are compared for blanking are shifted (advanced/delayed) according to the shift of the signal replica used for generating the correlator channel signal corresponding to the blanked signal that subunit is configured to provide. Put differently, the thresholding schemes are adapted to the respective signal replica. Thus, the thresholding schemes BTHE, BTHP and BTHL are different from each other. As a consequence, at a same sampling time, the samples of blanked signal BE,I are likely not to be identical to the samples of blanked signal BP,I and BL,I (which will likely also not be identical). Likewise, the samples of blanked signal BE,Q, BP,Q and BL,Q are likely not to be identical to each other. Yet, even if the upper thresholds BTH+ and the lower thresholds BTH− for the in-phase signal component (denoted BTHI+ and BTHI−) and for the quadrature phase (denoted BTHQ+ and BTHQ−) are different, for a respective signal replica, they will all change simultaneously since they are synchronized with that signal replica.

FIG. 3 illustrates thresholding schemes BTHE, BTHP and BTHL wherein the upper thresholds BTH+ and the lower thresholds BTH− are based on both the constant value B0 and the variable parameter c(t) for the respective component signal. Thus, the upper thresholds BTH+ and the lower thresholds BTH− vary with the signal sequence of the respective component signal. Alternatively, applying the thresholding schemes BTHE, BTHP and BTHL may involve subtracting the variable parameter c(t) from the signal sequence of the signal component and then applying at least one threshold that is based on the constant value B0 to the result of the subtraction, i.e., to the difference of the signal sequence of the respective signal component and the variable parameter c(t). In this case, applying the respective thresholding scheme BTHE, BTHP or BTHL further comprises that after blanking, e.g., modifying signal portions, of the signal sequence resulting from the subtraction based on the at least one threshold, the variable parameter c(t) is reintroduced, e.g., added, to the blanked signal sequence (blanked difference of the signal sequence of the component signal and the variable parameter), thus obtaining the respective blanked signal BE,I, BP,I, BL,I, BE,Q, BP,Q or BL,Q.

Next, effects of having thresholding schemes adapted to the signal replica used for obtaining the corresponding correlator channel signal will be explained.

As explained above, receiver processor 180 is configured to implement a plurality of tracking loops having different types. Namely, receiver processor 180 is configured to estimate the code delay with a DLL and to estimate the carrier phase, e.g., with a PLL or a FLL. In one common implementation, receiver processor PLLs and FLLs only exploit prompt correlator channel signals. However, this does not have to be the case for other types of tracking loops. In a DLL implementation, for instance, early correlator channel signals and late correlator signals are used to build a discriminator called early-late correlator (ELC). Other DLL implementations may even use additional types of correlator channel signals. The double delta correlator (DDC) discriminator, for instance, additionally process very early correlator channel signals and very late correlator channel signals. This concept can be extended to using U additional correlator signals generated as explained above. As for the standard ELC and DDC discriminators, these additional U correlator channel signals can be used in a specific discriminator which offers a compromise between immunity with respect to thermal noise, multipath or other types of degradation factors for receiver tracking performance.

For instance, compared to having only a thresholding scheme/thresholding schemes specific to, e.g., synchronized with, one specific signal replica, e.g., prompt replica RP, having specific thresholding schemes for several types of correlator channel signals, i.e., their respective associated signal replicas, may improve performance of any tracking loops/discriminators exploiting any of these types of correlator channel signals. As an example, the signal-to-noise power density ratio (C/NO), which is usually considered as a recognized figure of merit for such receiver processes, may improve. This may also hold for other figures of merit of the receiver processing performances, like the jitter of the code or carrier phase tracking errors. Thus, particular advantages may arise if a number of tracking loops (wherein the number is ≥1) the receiver 100 is configured to implement is configured to collectively, e.g., all of these tracking loops considered together, process at least a first correlator channel signal obtained based on a first signal replica and a second correlator channel signal obtained based on a second signal replica (the first signal replica different from the second).

As will be shown below, having specific, e.g., synchronized, thresholding schemes for several types of correlator channel signals may have a more significant effect for a larger early-late spacing than for a smaller one.

Figure 4:
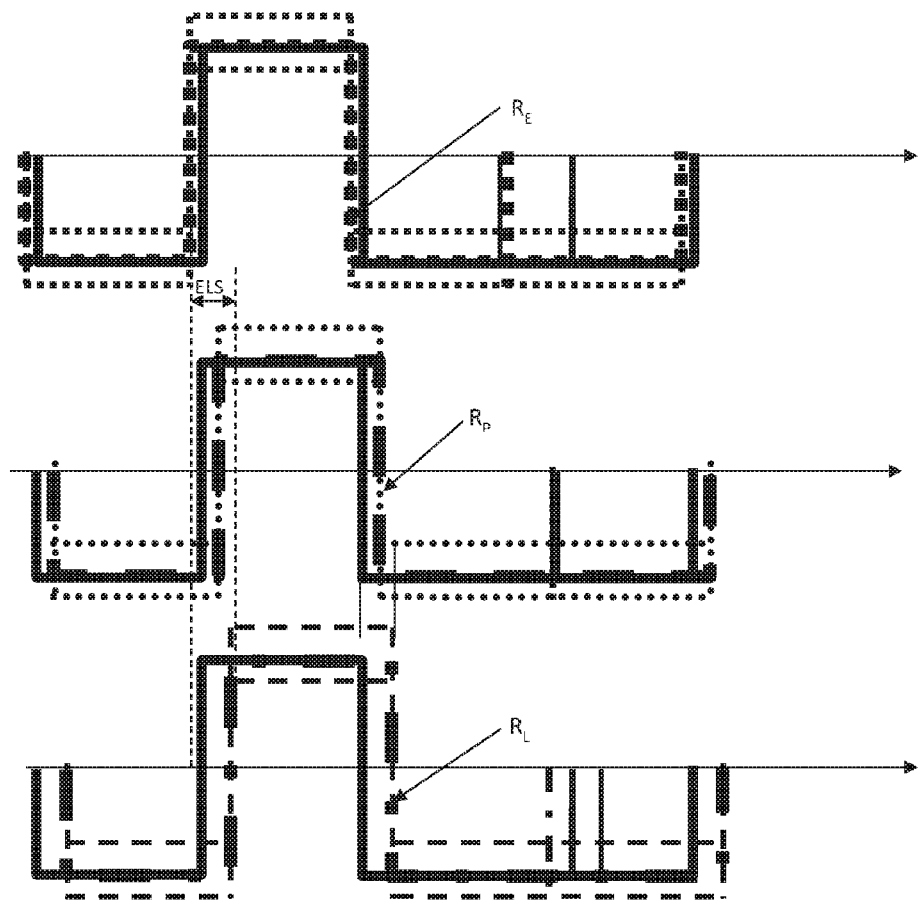
FIG. 4 is a schematic illustration of three thresholding schemes similar to that of FIG. 3, but with a smaller signal replica early-late spacing.

FIG. 4 is a schematic illustration of three thresholding schemes similar to that of FIG. 3, but with a smaller early-late spacing. For the sake of clarity, most reference signs have been omitted. Again, FIG. 4 refers to a situation where the thermal noise has a smaller power than signal SD,IF. As is apparent from FIG. 4, when the early-late spacing (ELS in FIG. 4) is narrow, the corresponding early, late and prompt replicas RE, RP and RL are very close to each other. As a consequence, compared to the scenario of FIG. 3, the samples of the blanked signals BE,I and BE,Q obtained from applying a respective thresholding scheme BTHE and respectively used for the calculation of the early correlator channel signals EI and EQ and the samples of the blanked signals BL,I and BL,Q will differ less from the samples of a respective blanked signal BP,I or BP,Q. Compared to using thresholding schemes synchronized with e.g., only prompt replica RP, i.e., BTHP, having specific, e.g., synchronized, thresholding schemes for several types of correlator channel signals thus has more impact, e.g., in terms of C/NO, in the scenario of FIG. 3.

Put differently, having specific, e.g., synchronized, thresholding schemes for several types of correlator channel signals may enable comparatively high receiver processing performance for a comparatively wide range of shifts between the signal replicas, for instance expressed in terms of early-late-spacing. Thus, benefits may be obtained for a wide range of receiver configurations.

Figure 5:
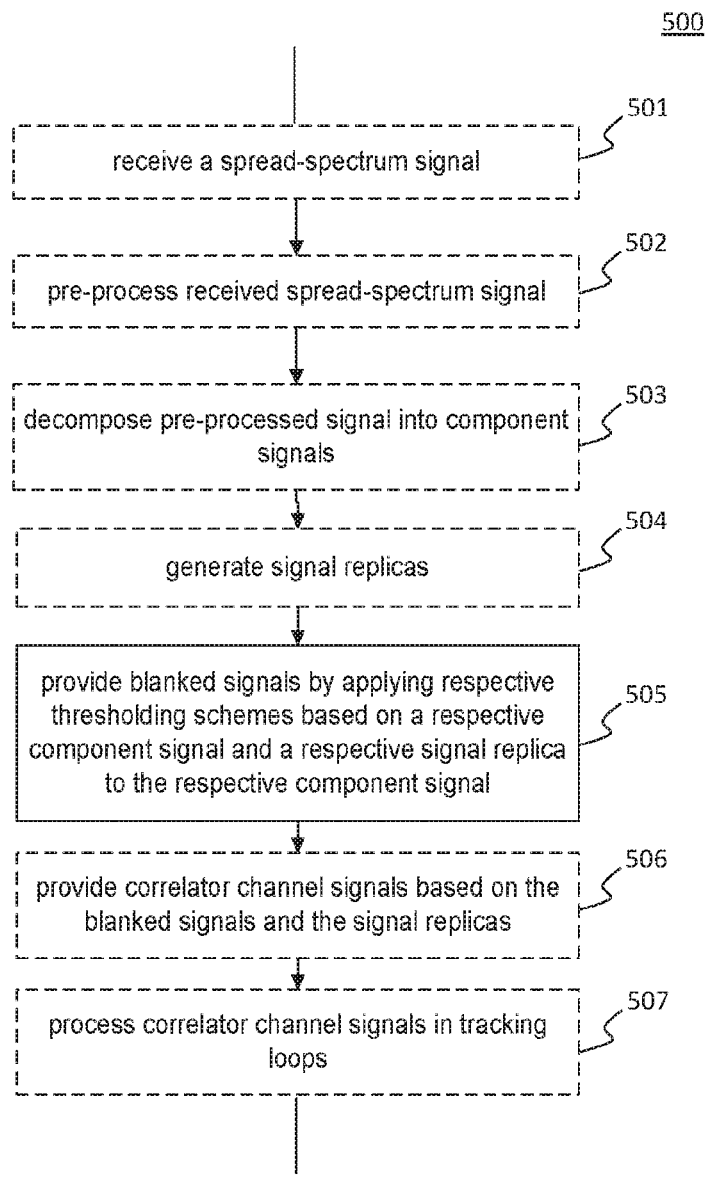
FIG. 5 is a flow chart schematically illustrating an embodiment of a method according to the third aspect of the present disclosure, the method for instance being performed by the receiver of FIG. 1.

FIG. 5 is a flow chart 500 schematically illustrating an embodiment of a method according to the third aspect of the present disclosure, the method, for instance, being performed by receiver 100 of FIG. 1. Therein, the blocks of steps 501 to 504 as well as of steps 506 and 507 are shown with dashed outlines as it is optional to consider them part of the embodiment.

As shown in flow chart 500, in a first step 501 a spread-spectrum signal is received, which is subsequently pre-processed in step 502. Step 503 comprises decomposing the thus obtained pre-processed signal into signal components. Further, signal replicas are generated in step 504. In flow chart 500, step 504 is performed after the signal decomposition of FIG. 503. Yet, the reverse order is also possible, as well as steps 503 and 504 being performed concurrently or at least overlapping in time. In step 505, blanked signals are provided. Therein, each blanked signal is obtained by applying a respective thresholding scheme based on a respective signal component and a respective signal replica to the respective signal component. In step 506, correlator channel signals based on the blanked signals and the signal replicas are provided. Each of the correlator channel signals is obtained by correlating its corresponding blanked signal with the respective signal replica based on which the thresholding scheme applied to obtain that blanked signal has been obtained in step 505. Finally, in step 507, the correlator channel signals are processed in tracking loops.

All presented embodiments are only examples. Any feature presented for a certain embodiment may be used with any aspect of the disclosure on its own or in combination with any feature presented for the same or another example embodiment and/or in combination with any other feature not mentioned. Any feature presented for an example embodiment in a certain category may also be used in a corresponding manner in an example embodiment of any other category.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An apparatus comprising:
a blanker configured to provide a plurality of blanked signals, each blanked signal corresponding to a respective correlator channel signal of a plurality of correlator channel signals, the correlator channel signal being obtained based on the respective blanked signal and a respective signal replica of a plurality of signal replicas, the signal replicas being shifted with respect to each other,
wherein the blanker is configured to obtain each blanked signal based on applying a respective thresholding scheme to a respective signal component of a plurality of signal components derived from a received spread-spectrum signal,
wherein the respective thresholding scheme is based on the respective signal component and the respective signal replica,
wherein the respective thresholding scheme applied to the signal component of the plurality of signal component derived from the received spread-spectrum signal varies with a signal sequence of that signal component,
wherein the thresholding scheme is based on a constant value and a variable parameter varying with the signal sequence of the signal component, and
an estimator configured to estimate a characteristic indicative of a power of the received spread-spectrum signal, wherein the blanker is configured to determine the variable parameter based on an amplitude and sign of the signal sequence of the signal component scaled by a scaling factor based on the characteristic indicative of a power of the received spread-spectrum signal.

2. The apparatus according to claim 1, wherein a signal component of the plurality of signal components derived from the received spread-spectrum signal is an in-phase signal component; and another signal component of the plurality of signal components derived from the received spread-spectrum signal is a quadrature-phase signal component.

3. The apparatus according to claim 1, wherein:
the constant value is based on a parameter indicative of a characteristic of an influence, such as noise or interference, present in the received spread-spectrum signal.

4. The apparatus according to claim 3, wherein the apparatus further comprises: the estimator configured to estimate at least one parameter indicative of a characteristic of thermal noise in the received spread-spectrum signal.

5. The apparatus according to claim 1, wherein the respective thresholding scheme the blanker is configured to apply in order to obtain a respective blanked signal is synchronized with the signal replica based on which the correlator channel signal corresponding to the respective blanked signal is obtainable.

6. The apparatus according to claim 1, wherein each thresholding scheme comprises at least two thresholds comprising at least one lower threshold and at least one upper threshold.

7. The apparatus according to claim 1, wherein the apparatus is configured to implement a number of tracking loops, the number being equal to or greater than 1, the tracking loops being configured to collectively process at least a first correlator channel signal corresponding to a blanked signal obtained based on a first signal component and a second correlator channel signal corresponding to a blanked signal obtained based on a second signal component, the first signal component being different from the second signal component.

8. The apparatus according to claim 1, wherein the apparatus is configured to implement a number of tracking loops, the number being equal to or greater than 1, the tracking loops being configured to collectively process at least a first correlator channel signal of the plurality of correlator channel signals and a second correlator channel signal of the plurality of correlator channel signals, the first correlator channel signal obtained based on a first signal replica and a second correlator channel signal obtained based on a second signal replica, the first signal replica being different from the second signal replica.

9. The apparatus according to claim 1, wherein the received spread-spectrum signal is one of a global navigation satellite system signal, a terrestrial navigation signal, a communication signal, or a radar signal.

10. The apparatus according to claim 1, wherein the apparatus comprises a correlator configured to provide the plurality of correlator channel signals.

11. The apparatus of claim 1, wherein the blanker is arranged in a digital receiver channel.

12. A receiver comprising the apparatus according to claim 1.

13. A method comprising:
providing a plurality of blanked signals, each blanked signal corresponding to a respective correlator channel signal of a plurality of correlator channel signals,
obtaining the correlator channel signal based on the respective blanked signal and a respective signal replica of a plurality of signal replicas, the signal replicas being shifted with respect to each other, wherein each blanked signal is obtained by applying a respective thresholding scheme to a respective signal component of a plurality of signal components derived from a received spread-spectrum signal, wherein the respective thresholding scheme is based on the respective signal component and the respective signal replica, wherein a respective thresholding scheme is applied to a signal component of the plurality of signal component derived from the received spread-spectrum signal and varies with a signal sequence of that signal component, wherein the thresholding scheme is based on a constant value and a variable parameter varying with the signal sequence of the signal component, and an estimator is used to estimate a characteristic indicative of a power of the received spread-spectrum signal, wherein the blanker is configured to determine the variable parameter based on an amplitude and sign of the signal sequence of the signal component scaled by a scaling factor based on the characteristic indicative of a power of the received spread-spectrum signal.

* * * * *